United States Patent
Keret et al.

(10) Patent No.: US 11,170,088 B2
(45) Date of Patent: Nov. 9, 2021

(54) SYSTEM AND METHOD FOR PERFORMING VOICE BIOMETRICS ANALYSIS

(71) Applicant: Nice Ltd., Ra'anana (IL)

(72) Inventors: Matan Keret, Oulu (FI); William Mark Finlay, Tucker, GA (US); Peter S. Cardillo, Atlanta, GA (US)

(73) Assignee: NICE LTD., Ra'Anana (IL)

( * ) Notice: Subject to any disclaimer, the term of this patent is extended or adjusted under 35 U.S.C. 154(b) by 0 days.

(21) Appl. No.: 16/857,397

(22) Filed: Apr. 24, 2020

(65) Prior Publication Data

US 2020/0250290 A1 Aug. 6, 2020

Related U.S. Application Data

(63) Continuation of application No. 15/988,251, filed on May 24, 2018, now Pat. No. 10,678,899.

(51) Int. Cl.
| | |
|---|---|
| *G10L 15/00* | (2013.01) |
| *G10L 17/00* | (2013.01) |
| *G06F 21/32* | (2013.01) |
| *G10L 25/51* | (2013.01) |
| *G10L 17/04* | (2013.01) |
| *G10L 17/02* | (2013.01) |

(52) U.S. Cl.
CPC .............. *G06F 21/32* (2013.01); *G10L 17/02* (2013.01); *G10L 17/04* (2013.01); *G10L 25/51* (2013.01)

(58) Field of Classification Search
None
See application file for complete search history.

(56) References Cited

U.S. PATENT DOCUMENTS

| | | | |
|---|---|---|---|
| 9,042,867 B2* | 5/2015 | Gomar | G10L 17/00 455/411 |
| 9,917,833 B2 | 3/2018 | Gomar | |
| 10,678,899 B2* | 6/2020 | Keret | G10L 17/02 |
| 2018/0152446 A1 | 5/2018 | Gomar | |

OTHER PUBLICATIONS

Ondrej Glembek et al., "Voice Biometry Standard—Draft", Brno University of Technology—Czech Republic Jul. 17, 2015; pp. 1-15.

* cited by examiner

*Primary Examiner* — Satwant K Singh
(74) *Attorney, Agent, or Firm* — Pearl Cohen Zedek Latzer Baratz LLP

(57) ABSTRACT

In a system and method for audio analysis in a cloud-based computerized an authentication (RTA) manager micro-service may send an audio packet to a voice processor micro-service. The voice processor may extract features of the audio. The RTA manager may obtain the extracted features from the voice processor; calculate, based on the extracted features, a quality grade of the audio packet, and send the extracted features to an at least one voice biometrics engine if the quality grade is above a threshold. Each of the at least one voice biometrics engines may be configured to generate a voiceprint of the audio packet, based on the extracted features of the audio packet and to perform at least one of: authenticate a speaker, detect fraudsters, and enrich a previously stored voiceprint of the speaker with the voiceprint of the audio packet.

17 Claims, 7 Drawing Sheets

SYSTEM AND METHOD FOR PERFORMING VOICE BIOMETRICS ANALYSIS

RELATED APPLICATION DATA

The present application is a continuation of prior U.S. application Ser. No. 15/998,251, filed on May 24, 2018, entitled "SYSTEM AND METHOD FOR PERFORMING VOICE BIOMETRICS ANALYSIS" and incorporated by reference herein in its entirety.

FIELD OF THE INVENTION

Embodiments of the invention relate to performing voice biometrics analysis. In particular, embodiments of the invention relate to performing voice biometrics analysis in cloud-based computerized systems.

BACKGROUND OF THE INVENTION

Voice biometrics (VB) may be used to identify and authenticate speakers, for example, in call centers. Audio packets containing speech may be analyzed, and a voiceprint may be generated and used to identify the speaker. A voiceprint may be specific to a user, similar to a fingerprint. Voiceprints may be used for operations such as enrollment or authentication of a speaker, and for fraud detection, for example by comparing voiceprints of a speaker to voiceprints of known fraudsters.

Current VB engines are session-based. A stream of data from a call, e.g., one speaker in a call, is processed and accumulated by the engine. Once there is enough speech, a voiceprint is created from the accumulated data. Due to this method, all the data of a speaker in a certain call should be passed to a single designated engine, in the case of multiple engines. Only the designated engine processes the voice and thus only this engine can perform biometric operations based on the voice. When a call starts, and data starts to flow, a session is opened with one of the VB engines. Data buffers of a caller's data may be provided to the chosen VB engine. When the system gets a request from the client side, e.g., from the agent (e.g. a person) that is handling the call with the caller, the request must be directed to the same VB engine that has been analyzing the data of the call. The request may be for example: Authenticate the caller, compare to known fraudsters or enrich an existing voiceprint. Thus, each call is engaged to a single VB engine which reduces the flexibility end efficiency of the system.

SUMMARY

According to embodiments of the invention, there is provided a system and method for audio analysis, performed by an at least one processor in a cloud-based computerized system. Embodiments of the invention may include an at least one real-time authentication (RTA) manager microservice configured to for example send a first audio packet to a voice processor, wherein the voice processor may be a micro-service configured to extract features of the audio; obtain the extracted features from the voice processor; calculate, based on the extracted features, a quality grade or rating of the first audio packet; and send the extracted features to an at least one voice biometrics engine if the quality grade is above a threshold.

According to embodiments of the invention, each of the at least one voice biometrics engines may be configured to generate a voiceprint of the first audio packet, based on the extracted features of the first audio packet.

Each of the at least one voice biometrics engines may authenticate a speaker by comparing a voiceprint of the first audio packet to a previously stored voiceprint of the same speaker, detect fraudsters by comparing the voiceprint of the first audio packet to previously stored voiceprints of known fraudsters, and/or enrich the previously stored voiceprint of the speaker with the voiceprint of the first audio packet.

The RTA management micro-services may be configured to obtain the voiceprint; send the voiceprint to an at least one voiceprint analyzer, wherein each of the at least one voiceprint analyzers may be configured to perform at least one of: authenticate a speaker by comparing a voiceprint of the first audio packet to a previously stored voiceprint of the same speaker, detect fraudsters by comparing the voiceprint of the first audio packet to previously stored voiceprints of known fraudsters; and enrich the previously stored voiceprint of the speaker with the voiceprint of the first audio packet.

According to embodiments of the invention, each of the at least one voiceprint analyzers may be configured to obtain the voiceprint and to perform at least one of: authenticating the speaker, detecting the fraudsters and enriching the previously stored voiceprint, in parallel.

According to embodiments of the invention, each of the RTA management micro-services may be configured to: store the extracted features in a repository if the quality grade or rating is below the threshold; upon receiving a second audio packet from a same speaker as the first audio packet, retrieve the voice features of the first audio packet; and send the second audio packet to a voice processor together with the retrieved voice features of the first audio packet, wherein the voice processor may be configured to modify the extracted features based on the second audio packet.

According to embodiments of the invention, each of the RTA management micro-services may be configured to: obtain the modified extracted features from the voice processor; calculate, based on the modified extracted features, an updated quality grade; send the modified extracted features to the at least one voice biometrics engine if the updated quality grade is above the threshold; store the modified extracted features in the repository if the updated quality grade is below the threshold; and repeat the above until a session with the speaker is terminated.

According to embodiments of the invention, a quality grade may indicate an amount of speech in the first audio packet and the updated quality grade may indicate a total amount of speech in the first and the second audio packets.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
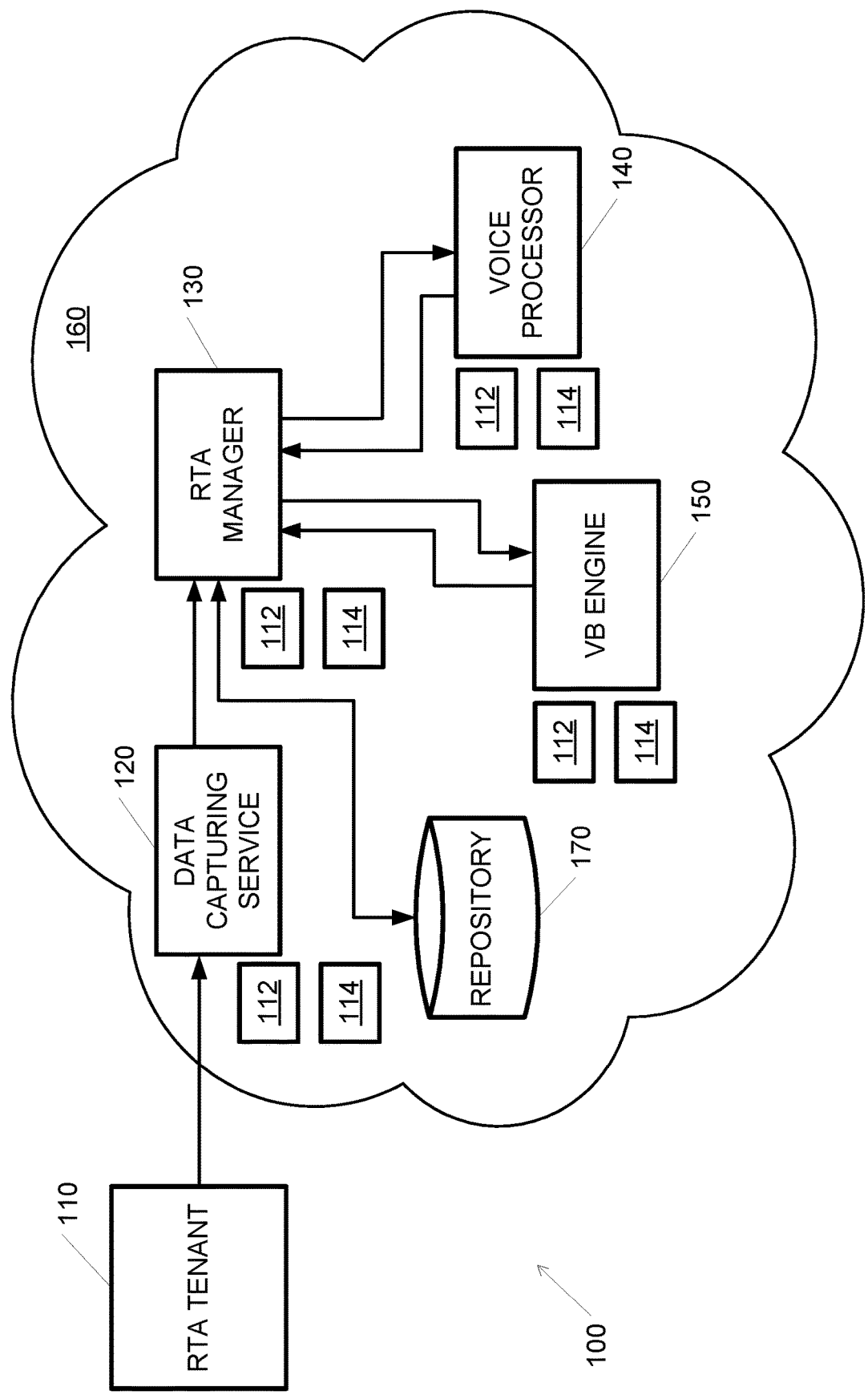
FIG. 1 schematically illustrates a system for performing voice biometrics analysis in a cloud-based computerized system, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention pertain, inter alia, to the technology of call centers, or other systems where VB is used. Embodiments may provide an improvement to VB technology by for example improving performing VB analysis especially in cloud-based computerized systems. Embodiments of the invention provide unique two-phase analysis of voice samples that enables more flexibility and more efficient usage of resources (e.g., computing resources) in a cloud-based system.

In prior art systems the biometric requests as well as all the analyzed data (e.g., call data of a speaker) must flow to the same VB engine. In some implementations, one component may perform audio data buffering and occasionally send or transmit the buffered audio data to a VB engine, or send all of the audio data at once. The VB engine may then perform the speech analytics, voice features extraction and the voice biometrics analysis. However, this approach could cause a waste of computational power, for example if there wasn't enough speech. Additionally, this implies that the load balancer and the clients have to implement stickiness, e.g., adhere to a single VB engine throughout a single call. Dividing VB analysis to phases or sections (e.g. two phases) as disclosed herein loosens this requirement. Call data of a single caller may be analyzed by a plurality of VB engines. This enables efficient auto scale of computerized resources. For example, a single call may be analyzed by a plurality of micro services, according to the type and volume of needed processing. In case more than one type of analysis is required, e.g., in case both authentication and fraud detection are required, these processes may be performed in parallel by a plurality of micro-services. In contrast, in prior art systems auto scale is problematic and complicated since voice data must be accumulated and analyzed by a single VB engine. Auto scale enables testing voiceprints against practically unlimited size fraudsters watch lists, since a list may be divided between as many VB engines as required. Embodiments of the invention may also provide easier service updates, since it may be easier to identify which instances can be safely turned off. This is in contrast to prior art systems in which a VB engine cannot be turned off as long as a call that is being analyzed by this VB engine continues. Similarly, if a VB engine crashes in prior art systems, data and analysis results of a complete call may be lost, whereas if a plurality of VB engines are used and one crashes, only data related to this particular micro-service is lost.

As used herein, a cloud-based computerized system may refer to a collection of processing and storage resources connected by a network, e.g., the internet. These resources may be allocated for processing or storage for a limited or defined duration. Processing in a cloud-based computerized system may be performed by dedicated applications, also referred to as micro-services, running on the processing resources. Resources for micro-services may be allocated as required and released when not needed.

According to embodiments of the invention, voice features of an audio packet may be calculated by a first instance, e.g., a first micro-service or application in a cloud-based computerized system, and biometrics calculations may be performed on the voice features by a second instance, a second micro-service or application in the cloud-based computerized system.

As used herein, voice features or an audio features object (also referred to as a features object) may refer to an object or computer data package or structure such as vectors and matrices, that contains a binary, floating point, or digital, computerized, representation of characteristics of a voiced recording. Voice features or an audio features object are typically shorter than a source audio recording. In some embodiments the voice features object may include intermediate results of manipulating raw audio data, that are sufficient as a basis for calculating a voiceprint of the recorded voice. Thus, a first stage of a calculation may include calculating an audio features object based on the raw audio data, and a second stage of the calculation may include calculating a voiceprint based on the audio features object. The raw audio data may not be needed at all at the second stage of the calculation since the voiceprint may be calculated based on the audio features object alone. For example, an audio features object may include standard "gamma" and "X" derived features, and the "gamma" and "X" features may be used later for I-vector extraction, which is a type of a voiceprint. In some embodiments, other features may be used, as long as these features are sufficient for voiceprint generation. In some embodiments, a compressed form of the features object may be used (e.g., features may be represented as compressed vectors rather than as vectors of full 32-bit floating numbers). It is noted that compressing the features object typically does not result in a noticeable degradation in the accuracy of I-vector generation. For example, a features object of an audio packet of 1 millisecond interval may include 100,000 32-bit floating numbers. The size of this features object may be reduced with small to no loss in accuracy by, for example, using a 16-bit fixed point representation rather than the 32-bit floating numbers. Other compression schemes may also be used, exploiting the inherent correlation within the set of values in the features object.

In some embodiments, the audio features object may include or may be accompanied by an indication of whether that audio packet includes or does not include speech, an identification (ID) string for identifying the audio source that generated this object (e.g., a call ID), and start time and end time of the audio packet, e.g., relatively to the start of the call.

The voice features object may include normalization parameters that may be used to correctly merge one voice features object with another, e.g., to avoid boundary issues for a continuous audio stream. For example, feature extraction of an audio frame may include applying a moving window or a moving filter with longer time duration across the audio data. For example, for an audio frame of 10 milliseconds, the time duration of the moving window may be 30-50 milliseconds. Thus, a feature object of an audio frame may be dependent on audio both earlier and later than the audio frame under consideration. To ensure that the boundaries are correctly smoothed, the raw audio of the duration of the moving window (e.g., 50 milliseconds) at the beginning and end of the audio packet are preserved. The features corresponding to audio frames at the boundaries of an audio packets may be processed at the time feature objects are merged, using the raw audio data that has been preserved at the beginning and end of the current audio packet, as well as in the preceding or following audio packet.

Reference is made to FIG. 1, which schematically illustrates a system 100 for performing voice biometrics analysis in a cloud-based computerized system 160, according to embodiments of the invention. System 100 may include a real-time authentication (RTA) tenant 110 and a cloud-based computerized system 160. While FIG. 1 includes a single RTA tenant 110, it may be appreciated that system 100 may include a plurality of RTA tenants 110, each connected to a data capturing service 120. Data capturing service 120, RTA manager 130, voice processor 140 and VB engine 150 may all be micro-services running on cloud-based computerized system 160. Cloud-based computerized system 160 may include a plurality of each of data capturing service 120, RTA manager 130, voice processor 140 and VB engine 150 micro-services. These micro services may be dynamically allocated or instantiated as required according to current load. Data capturing service 120, RTA manager 130, voice processor 140 and VB engine 150 micro-services may be added or removed by a dedicated auto-scale blocks 112 and load may be distributed by load balancers 114, as known in the art.

RTA tenant 110 may be a telephony system, a call center or any other system that captures voiced audio data. Call data (e.g., audio and possibly other data representing conversations or telephone calls) may be streamed (e.g. provided) from an RTA tenant 110 and may be buffered by data capturing service 120. In some embodiments, a single call may be handled by a single data capturing service 120. A single data capturing service 120 may serve many calls from a single or a plurality of RTA tenants 110. A plurality of calls, sourced from a plurality of RTA tenants 110, may reach any of data capturing services 120. Any RTA tenant 110 may be served by any data capturing service 120. In some embodiments, a single data capturing service 120 may be allocated to each RTA tenant 110. In any case, once a call was associated with a data capturing service 120, all the audio data originating from that call will reach the same data capturing service 120. In some embodiments data capturing services 120 may be a serverless component (e.g., not a micro-service), such as a cloud streaming cache, e.g., Amazon® web services (AWS) Kinesis® data streams. A cloud streaming cache may provide auto-scale based on the activity and traffic in system 100.

The audio stream may be divided to audio packets of specified duration of audio, e.g., 1 second. Typically, a buffer may hold an audio packet. Data capturing service 120 may be or may include a micro-service that may collect call audio data buffers received from an RTA tenant 110. A caller may be provided with a caller identification number (ID) by RTA tenant 110. Call metadata including for example, caller ID, call ID, account number, phone number, country\ state code of the caller, etc. may be sent from RTA tenant 110 to data capturing service 120. In some embodiments, a request may be sent to RTA manager 130, together with the buffered audio data and the caller ID and other metadata. The request may include a command to perform a biometric analysis for one or more of caller enrollment, authentication, fraud detection etc. The request may be sent from for example data capturing service 120 or from RTA tenant 110. In some embodiments, only the call metadata (and not the buffered audio data itself) may be sent with the request to RTA manager 130. The metadata may include a link or a pointer to the buffered audio data. That pointer may be sent in turn to voice processor 140 and voice processor 140 may get the buffered audio data directly from the source, which may be data capturing service 120 or other audio capturing device or instance.

In some embodiments RTA manager 130 may be preprogrammed to perform a set of biometrics analysis operations, for example, check if the caller is enrolled, if the caller is not enrolled, verify that the caller is not a fraudster from the list of known fraudsters, and if he is not, enroll the caller, if the caller is already enrolled, authenticate the caller. Enrolling a caller may refer to the process of adding an identified caller to a list or database of callers and associating a voiceprint to this caller. Authenticating a caller may include verifying the identity of the caller by comparing the voiceprint generated in the present call to a previously stored voiceprint of the same caller, e.g., to a voiceprint that was associated with this caller during enrollment.

RTA Manager 130 may be or may include a micro-service that may expose or communicate with an application programming interface (API) for voice biometric operations such as authenticate, detect fraudsters, enroll etc. RTA manager 130 may act as a management layer of voice biometrics analysis process. RTA manager 130 may obtain audio packets and metadata related to the same call as the audio packets, may send or transmit the audio data to voice processor 140, may obtain extracted or determined voice features from voice processor 140, determine or calculate a rating or quality grade based on the extracted voice features, and transmit or send the voice features to one or more voice biometrics engines 150 to perform the required biometric tasks, or store the voice features in repository 170 based on the quality grade, as disclosed herein. The quality grade may be or may be based on the amount of speech in the audio packet or a total amount of speech in a plurality of packets, e.g., if the speech duration (or total speech duration) is above a threshold, then the audio data may be sent for voiceprint calculation. In some embodiments the quality grade may be the percentage or the absolute duration of speech in the audio. In some embodiments, the quality grade may be calculated based on the amount of speech as well as other parameters such as a level of background noise, softness of the voice, loudness etc. For example, the quality grade may be calculated as a weighted average of a selection of parameters.

Voice processor 140 may be or may include a microservice that may receive an audio packet, process it and generate a voice features object as disclosed herein. If the audio packet is compressed, voice processor 140 may decompress the audio packet as part of the processing. Voice processor 140 may also accumulate or combine new voice features, or voice features of a new audio packet, into a given voice features object to enrich the voice features object.

Voice biometrics engine 150 may be or may include a micro service that may receive a voice feature object, create a voiceprint from the voice feature object, and perform various biometric comparisons.

Biometrics repository 170 may be a database that may store voiceprints and other relevant data and metadata.

System 100 may support a plurality of tenants 110 in a multi-tenancy configuration. RTA tenant 110 may configure, for example:

Voice biometrics background models, e.g., text-dependent and\or text-independent and supported languages. Optionally, specific models may be generated for some tenants 110. A background model may refer to a mathematically created binary object. The background model may be created using a certain set of recorded voice data, which has a known common ground of voice features. For example a background model may be created using voice collected from a group of people that speak the same language, have the same intonation, accent etc. The background models may then be used by voice processor 140 and/or VB engine 150 in order to normalize the extracted voice features and voiceprints and improve the accuracy of the results.

Minimum speech duration. The minimum speech duration may be used as a threshold for deciding whether to generate a voiceprint from an audio data or not.

Thresholds for authentication and fraud detection, e.g., a minimum biometric comparison score that is required in order to declare a successful match between two voiceprints.

According to some embodiments, RTA manager 130 buffers audio packets and related metadata, together with a request to perform a biometric analysis. RTA manager 130 may send a first audio packet to voice processor 140. Voice processor 140 may calculate or extract voice features from the audio packet. RTA manager 130 may obtain the extracted features from voice processor 140, and calculate, based on the extracted features, a quality grade of the audio packet. If the quality grade is above a threshold, voice processor 140 may send the extracted features to one or more voice biometrics engines 150, for performing a biometrics tasks. If the quality grade is below the threshold, RTA manager 130 may store the extracted features in repository 170. As the call progresses, more audio packets from the same speaker as the first audio packet may be obtained by RTA manager 130. Upon receiving a second audio packet, RTA manager 130 may retrieve, e.g., from repository 170 the voice features of the first audio packet, and send the second audio packet to voice processor 140 together with the retrieved voice features of the first audio packet. Voice processor 140 may process the second audio packet and may enrich, add or combine the voice features of the first audio packet with the voice features of the second audio packet. RTA manager 130 may obtain the enriched audio features from voice processor 140 and may calculate based on the modified audio features, an updated quality grade. If the updated quality grade is above the threshold, RTA manager 130 may send the modified extracted features to one or more voice biometrics engines 150. If the updated quality grade is still below the threshold and the call continues, the process may be repeated until the quality grade is above the threshold. In some embodiments, the process may be repeated until the call is terminated (e.g., one of the parties to the call hangs up or ends the call).

Figure 2:
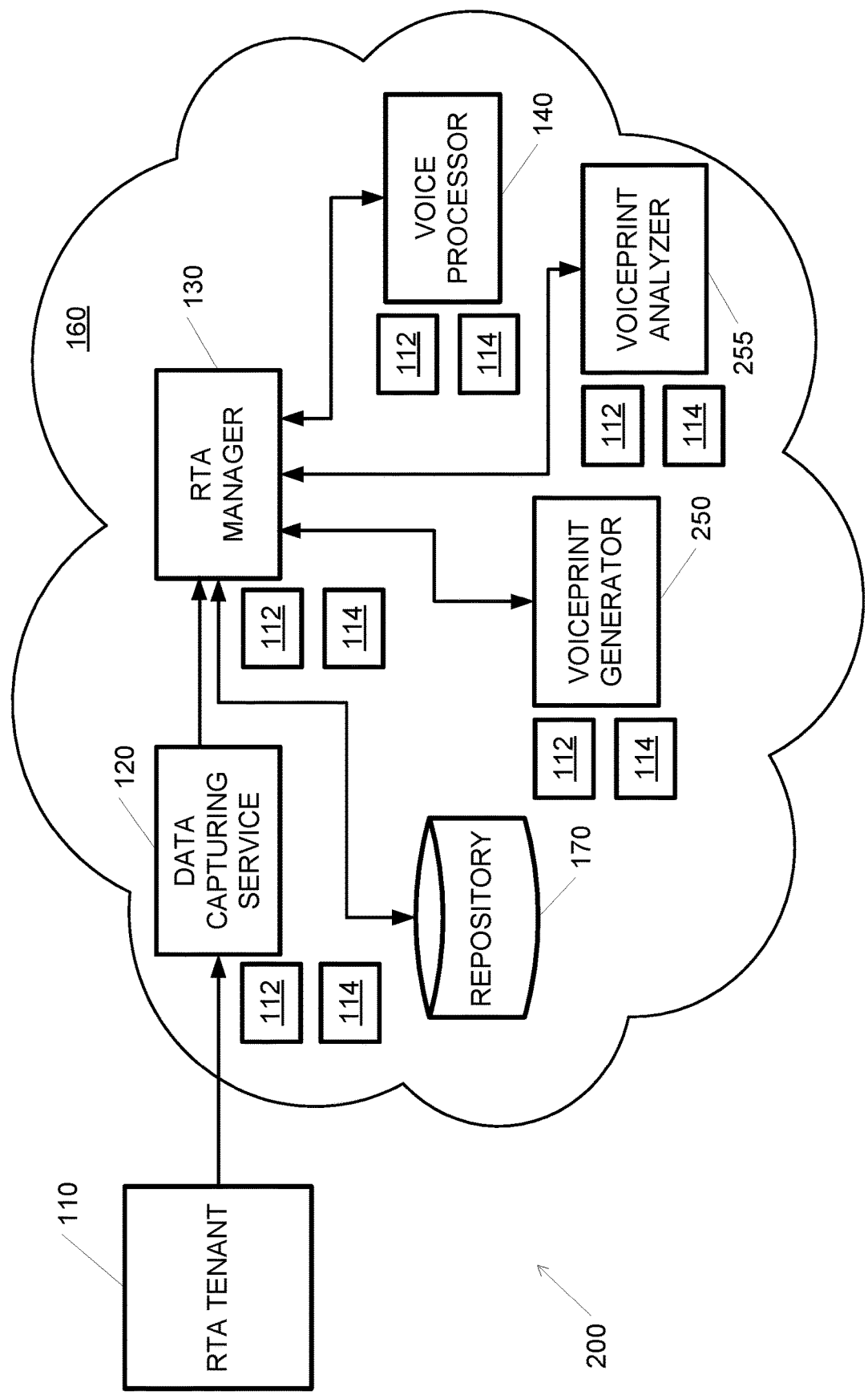
FIG. 2 schematically illustrates a modified system for performing voice biometrics analysis in a cloud-based computerized system, according to embodiments of the invention.

Reference is made to FIG. 2, which schematically illustrates a modified system 200 for performing voice biometrics analysis in a cloud-based computerized system 160, according to embodiments of the invention. System 200 may be similar to system 100 except for further breaking down or dividing VB engine 150 into two micro-processes: voiceprint generator 250 and voiceprint analyzer 255. Voiceprint generator 250 may obtain a voice feature object from RTA manager 130, similarly to VB engine 150, and may generate a voiceprint based on these features. The voiceprint may than be passed on, e.g., by RTA manager 130, to one or more voiceprint analyzers 255 for performing specific voice biometric tasks such as enrolment, authentication, enrichment of a voiceprint or fraud detection.

Figure 3:
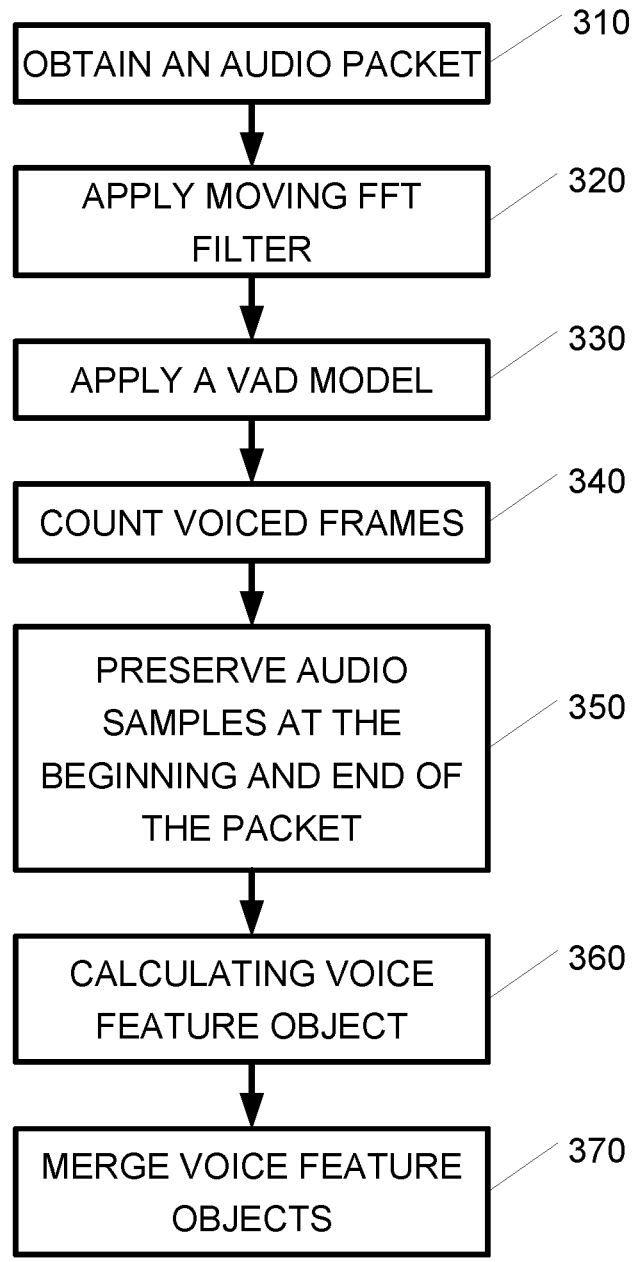
FIG. 3 is a flowchart of a method for calculating audio features, according to embodiments of the present invention.

Reference is now made to FIG. 3 which is a flowchart of a method for calculating audio features, according to embodiments of the present invention. The method for calculating audio features may be performed, for example, by voice processor 140 presented in FIGS. 1 and 2. In operation 310 an audio packet is obtained. In some embodiments the duration of audio included in an audio packet may be 1 second. An audio packet may be further divided into audio frames, e.g., of 10 milliseconds long. Packets may include other durations of audio. The audio may be sampled at a sampling rate of about 8 kHz or higher. Other durations and rates may of course be used. The audio packet may be a part of a stream of audio, e.g., an audio stream of a speaker or caller in a call. The start and stop time of the audio packet, relative to the start of the stream, may also be provided, in order to preserve continuity across the packet boundaries. In operation 320 a moving FFT filter of a given time window (e.g. a period with a duration), e.g., 10-50 milliseconds, may be applied across the audio packets. This may generate a spectrogram divided into a specific set of filter banks (e.g., specific frequency ranges), representing the energy of each frequency range. The energy in each filter bank, along with their first and second derivatives, may provide a spectral representation of the audio in the corresponding frame.

In operation 330 a voice activity detection (VAD) model, or a windowed energy detector may be applied to determine whether the analyzed audio frame represents a voiced or non-voiced audio. In operation 340 the voiced frames may be counted to determine the amount or percentage of voice or speech in the audio packet. In operation 350 audio frames at the beginning and end of the packet may be added to the voice feature object for future use, e.g., to smooth out transitions at the boundaries between packets when merging voice feature objects of consecutive packets. In operation 360, voice features of the audio packet may be calculated or generated. For example, "gamma" and "X" features may be calculated in operation 360. The voice features object may include the voice features, as well as the preserved audio frames, the number of voiced frames in the audio packet (e.g., as counted in operation 340), and other relevant data. In operation 370, feature objects of two consecutive audio packets may be merged or combined. For example, the feature objects of two consecutive audio packets may be merged by simply concatenating the two feature objects. If two packets represent a continuous set of time, then they may be merged to create a single object representing the entire time interval. If the two packets are not continuous, then both may be retained as separate until the intermediate packets are available. In some embodiments the audio frames preserved at the end of a first audio feature object and the audio frames saved at the beginning of a second (e.g., of an audio packet following the first audio packet), may be used to smooth out transitions at the boundaries between packets when merging the voice feature objects, as disclosed herein. Additional measurements, derived from the features analysis, such as gender may be added to the feature object.

VB engine 150 and voiceprint generator 250 may generate a voiceprint for a given audio feature object by, for example, calculating M Gaussian scores for each frame from the filter banks based on the audio features. Average occupancy of each of the M states (an M float vector) as well as the weighted average of the feature value for each state (an M×N matrix) may be calculated based on the Gaussian scores. The average occupancy and weighted average may be calculated for each frame and combined to create the composite voiceprint for larger collections of frames, e.g., for one or more packets. A voiceprint (also referred to as an i-vector) may be a fixed length floating point vector (for example, of 400 elements), which may be derived from the features object, as disclosed herein. Deriving the voiceprint from the feature object may be a relatively expensive operation in terms of complexity and required processing capacity. Therefore, according to embodiments of the invention this computationally intensive operation may be performed only when sufficient speech has been detected. At the point of generating a voiceprint (e.g., i-vector), feature objects of a plurality of packets may be used.

Figure 4:
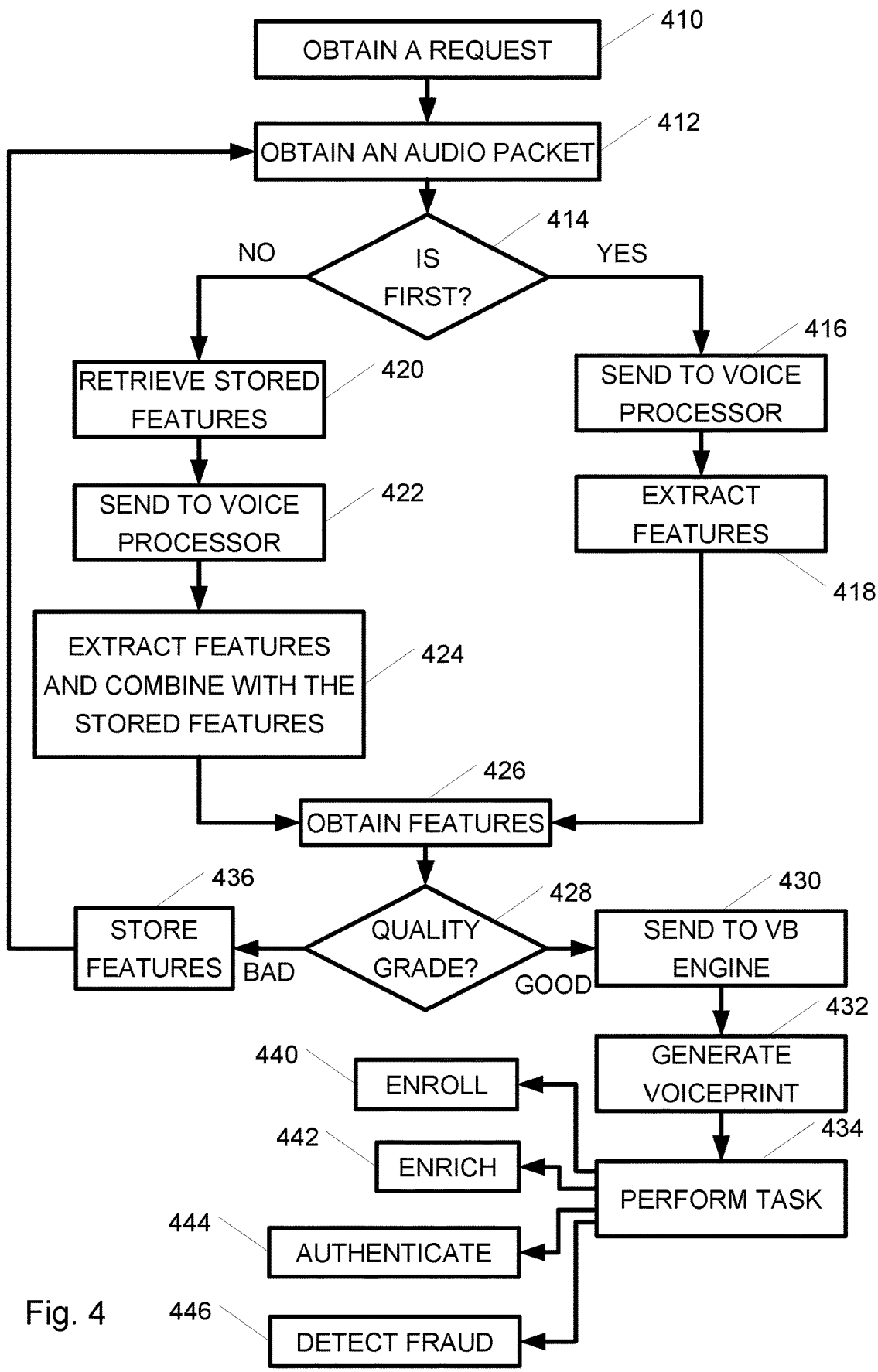
FIG. 4 is a high-level flowchart of a method for performing voice biometrics analysis in a cloud-based computerized system, according to embodiments of the invention.

Reference is made to FIG. 4, which is a high-level flowchart of a method for performing voice biometrics analysis in a cloud-based computerized system, according to some embodiments of the invention. In some embodiments, the method for performing voice biometrics analysis in a cloud-based computerized system may be performed by cloud-based computerized system 160 depicted in FIGS. 1 and 2. In operation 410 a request for performing a biometric operation may be obtained. For example, the request may be sent from data capturing device 120 and obtained by RTA manager 130. In some embodiments RTA manager 130 may perform biometric tasks in a predetermined order and operation 410 may be eliminated. In operation 412 an audio packet may be obtained. For example, the audio packet may be streamed from data capturing device 120 and obtained by RTA manager 130. In some embodiments operations 410 and 412 may be performed concurrently. In some embodiments metadata, including, for example, a caller ID and/or a call ID, may be obtained together with the audio packet.

In operation 414 it may be checked whether this is the first audio packet of the caller in that call. This may be performed, for example, based on the call ID. If this is a first audio packet, then the audio packet may be sent to a voice processor for audio feature extraction, as indicated in operation 416. For example, the audio packet may be sent to voice processor 140. In operation 418 features of the audio in the audio packet may be extracted or calculated and a feature object may be generated, as disclosed herein. For example, operation 418 may be performed by voice processor 140.

If the audio packet is not the first audio packet of the caller in a call, audio features of previous packets stores in a repository (e.g., repository 170) may be retrieved. In operation 422 the audio packet, together with the retrieved audio features may be sent to the voice processor for audio feature extraction. For example, the audio packet and the retrieved features may be sent to voice processor 140. In operation 424 features of the audio in the audio packet may be extracted or calculated, and combined with the retrieved features to generate a unified feature object.

In operation 426, the generated feature object may be obtained (e.g., at RTA manager 130). In operation 428 a quality grade may be obtained or calculated based on the feature object. If the quality grade is below a threshold, then the feature object may be stored, e.g., in repository 170), as indicated in operation 436, and the method may return to operation 412 to obtain more data packets, if the call continues. If the quality grade is above the threshold, then the feature object may be sent to a VB engine (430) for generating a voiceprint. For example, the amount of speech may be used as a quality grade and the threshold may be the minimum speech duration. For example, the feature object may be sent to VB engine 150 depicted in FIG. 1 or to voiceprint generator 250 depicted in FIG. 2. In operation 432, a voiceprint may be generated based on the feature object. The voiceprint may be stored in repository 170. For example, the voiceprint may be generated by VB engine 150 or voiceprint generator 250.

In operation 434 a biometric task, e.g., the biometric task obtained in operation 410, may be performed. The task may be enrolling a new caller, as indicated in block 440, enriching a voiceprint, as indicated in block 442, authenticating a caller, as indicated in block 444 and/or detecting fraudsters, as indicated in block 446. Authenticating a speaker or a caller in block 444 may be performed for example by comparing the voiceprint to a previously stored voiceprint of the same speaker. Detecting fraudsters in block 446 may be performed by comparing the voiceprint to previously stored voiceprints of known fraudsters. Enriching in operation 442 may be performed by combining a previously stored voiceprint of the speaker with the voiceprint of the first audio packet. Combining voiceprints may include merging or concatenating the two voiceprints into a single voiceprint. The enriched voiceprint may be stored in repository 170.

As disclosed herein, due to the nature of operation of a cloud-based computerized system, a micro-service may be assigned or allocated for each required task, so that several tasks may be performed in parallel. Similarly, the task of detecting fraudsters, block 446, may be performed by a plurality of micro-services, each compering the voiceprint a different list of known fraudsters. Operation 434 may be performed by one or more VB engines 150 and/or by one or more voiceprint analyzers 255. When the call terminates, the feature object of the caller or speaker may be deleted from repository 170.

Embodiments of the invention may enable performing the computationally intensive biometric operations in parallel. A single voice features object or structure may be used for enrichment of an existing voiceprint, in parallel to using it for authentication of the caller, and comparing the caller to a black-list of known fraudsters.

Advantages of embodiments of the invention will now be demonstrated with relation to fraudster detection. The operation of detecting a fraudster on a call typically includes comparisons of the caller's voice to voices of known fraudsters (e.g., by comparing voiceprints). The list of fraudsters maintained by various entities grows with time, as new fraudsters are exposed and marked. In the example analysis below, it is assumed that the average time to compare a speaker with a single voiceprint is 0.2 milliseconds. Of course, other time periods may be used.

Figure 5A:
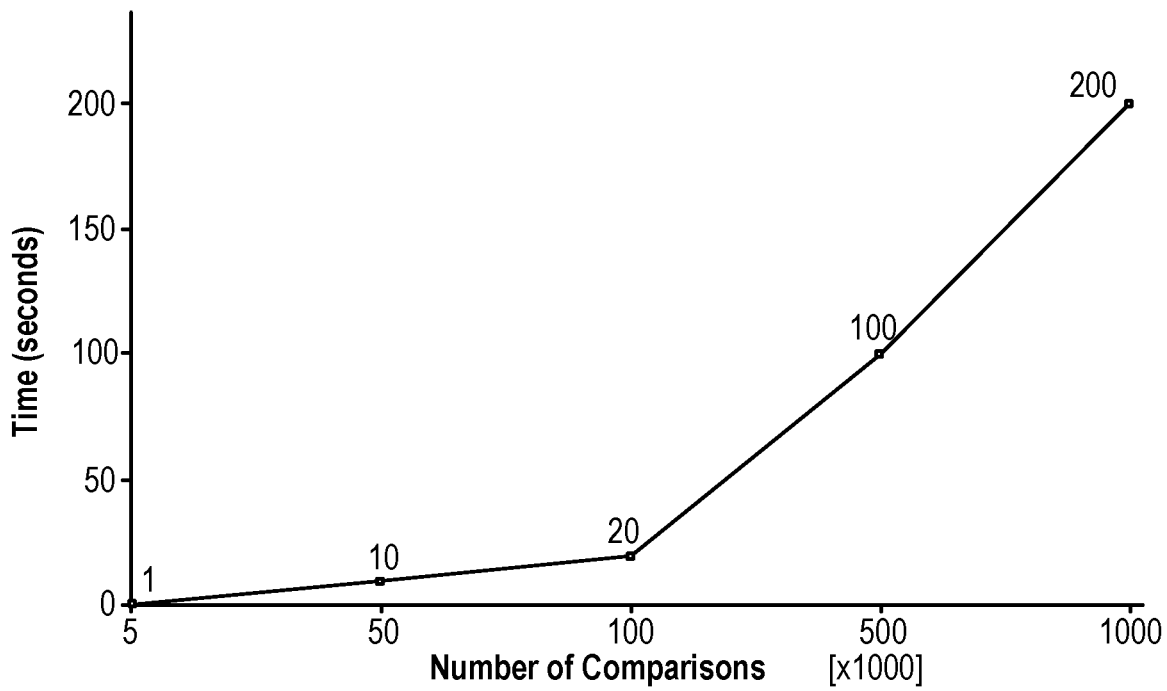
FIG. 5A presents the time required for performing comparisons versus the number of required comparisons in prior art systems.

In traditional voice biometrics systems, due to the session-full approach, all the comparisons are performed by a single voice biometrics engine. FIG. 5A presents the example time required for performing comparisons versus the number of required comparisons (e.g., the number of voiceprints of known fraudsters) in prior art systems. As can be seen in FIG. 5A, as the fraudsters list size increases, the number of comparisons increases and so is the global processing time.

Figure 5B:
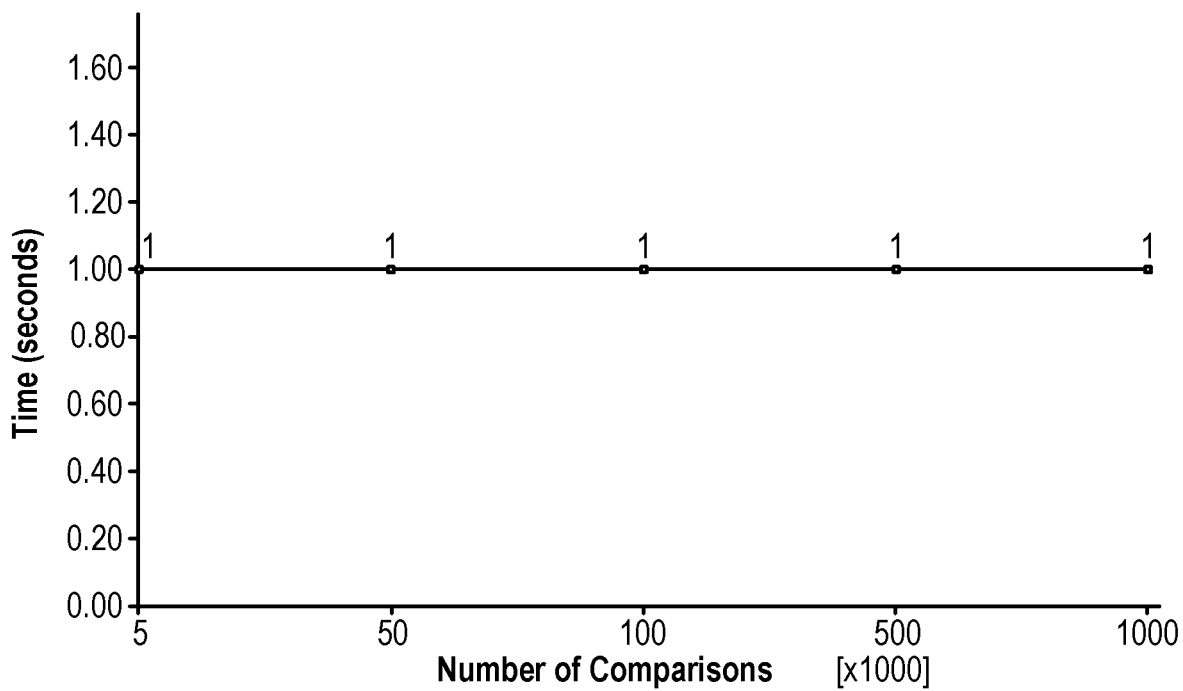
FIG. 5B presents the time required for performing comparisons versus the number of required comparisons in a system for performing voice biometrics analysis in a cloud-based computerized system according to embodiments of the present invention.

FIG. 5B presents the time required for performing comparisons versus the number of required comparisons in an example system for performing voice biometrics analysis in a cloud-based computerized system according to embodiments of the present invention. In the example of FIG. 5B the number of fraudster comparisons is limited to up to 5,000 per one micro-service. If more than 5,000 comparisons are required, more micro-services may be allocated and used. As can be seen in FIG. 5B the size of fraudsters list does not substantially influence the time required for performing comparisons. For example, more processing power of a single processor or more processors (e.g., more of servers 710 depicted in FIG. 7) in a cloud (e.g., cloud-based computerized system 700 depicted in FIG. 7) may be brought into operation and freed up for other uses when the voice analysis is done.

While prior-art systems require maintaining a state, e.g., data related or representing the condition of the analysis at a point in time, on the voice biometrics engine, in the form of a session, embodiments of the present invention enable maintaining the state by storing for example a voice features structure object. Thus, according to embodiments of the invention, there may be no need for a session-based (e.g., call based), traditional buffering mechanism. Instead, a robust, session-less architecture may be provided for a voice biometrics cloud solution. Biometric operations may occur in parallel and micro-services may be cleanly decoupled, allowing auto-scaling, stateless API operations (e.g., API requests are independent from each-other and the micro-services that expose their APIs are not holding any internal states and thus all appropriate micro-services may serve requests in parallel), and advanced service upgrade flows.

Embodiments of the invention may provide improved computational efficiency since a voiceprint may be created only when it is useful. according to prior art, the voice is processed and a voiceprint is generated in response to the same request in a single and continuous flow. If the voiced part of the audio was too short, or if the audio had bad quality, then the voiceprint is still generated but is not useful and computation power is wasted. However, according to embodiments of the invention, the voice is analyzed first and a voice features object is generated. A quality grade of the voice is calculated based on the voice features. If the voice is not of sufficient quality (e.g., not enough speech, quality grade below a threshold), then the computationally extensive biometric algorithms are not performed at all.

Figure 6:
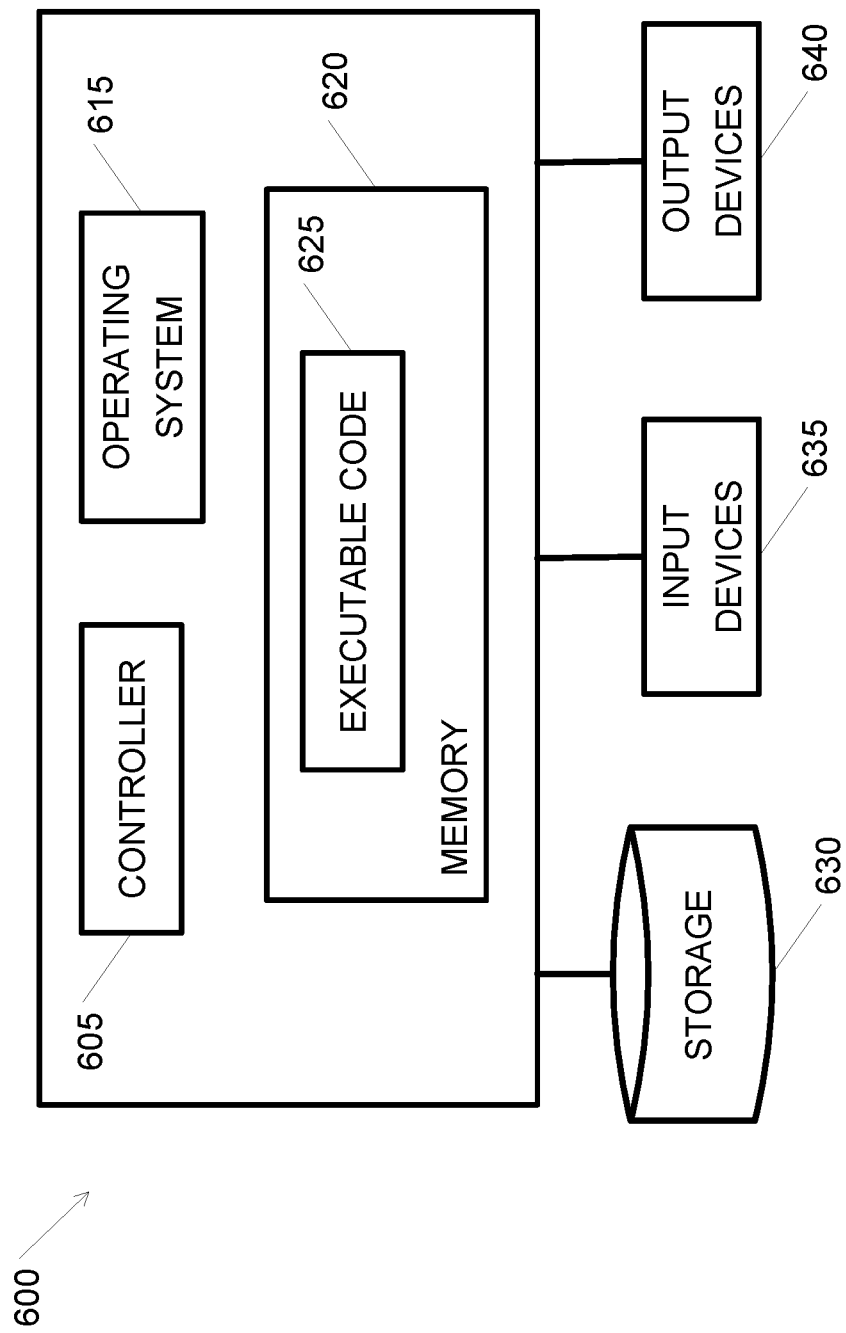
FIG. 6 is a high-level block diagram of an exemplary computing device according to some embodiments of the present invention.

Reference is made to FIG. 6, showing a high-level block diagram of an exemplary computing device according to some embodiments of the present invention. Computing device 600 may include a controller 605 that may be, for example, a central processing unit processor (CPU), a graphics processing unit (GPU), a chip or any suitable computing or computational device, an operating system 615, a memory 620, executable code 625, storage or storage device 630, input devices 635 and output devices 640. Controller 605 may be configured to carry out methods described herein, and/or to execute or act as the various modules, units, etc., for example by executing code or software. More than one computing device 600 may be included. Micro-services, engines, processes, and other modules described herein may be for example software executed (e.g., as programs, applications or instantiated processes, or in another manner) by one or more controllers 605. Multiple processes discussed herein may be executed on the same controller. For example, data capturing service 120, RTA manager 130, voice processor 140, VB engine 150, voiceprint generator 250 and voiceprint analyzer 255 presented in FIGS. 1 and 2 may be implemented by one or more controllers 605.

Operating system 615 may be or may include any code segment (e.g., one similar to executable code 625 described herein) designed and/or configured to perform tasks involving coordination, scheduling, arbitration, supervising, controlling or otherwise managing operation of computing device 600, for example, scheduling execution of software programs or enabling software programs or other modules or units to communicate. Operating system 615 may be a commercial operating system.

Memory 620 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 620 may be or may include a plurality of, possibly different memory units. Memory 620 may be a computer or processor non-transitory readable medium, or a computer non-transitory storage medium, e.g., a RAM.

Executable code 625 may be any executable code, e.g., an application, a program, a process, task or script. Executable code 625 may be executed by controller 605 possibly under control of operating system 615. For example, executable code 625 may be an application that when executed performs voice biometrics analysis as further described herein. Although, for the sake of clarity, a single item of executable code 625 is shown in FIG. 6, a system according to embodiments of the invention may include a plurality of executable code segments similar to executable code 625 that may be loaded into memory 620 and cause controller 605 to carry out methods described herein. For example, units or modules described herein may be, or may include, controller 605 and executable code 625.

Storage device 630 may be any applicable storage system, e.g., a disk or a virtual disk used by a VM. Storage 630 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content or data may be stored in storage 630 and may be loaded from storage 630 into memory 620 where it may be processed by controller 605. In some embodiments, some of the components shown in FIG. 6 may be omitted. For example, memory 620 may be a non-volatile memory having the storage capacity of storage 630. Accordingly, although shown as a separate component, storage 630 may be embedded or included in memory 620. Repository 170 may be implemented over storage 630.

Input devices 635 may be or may include a mouse, a keyboard, a touch screen or pad or any suitable input device. It will be recognized that any suitable number of input devices may be operatively connected to computing device 600 as shown by block 635. Output devices 640 may include one or more displays or monitors, speakers and/or any other suitable output devices. It will be recognized that any suitable number of output devices may be operatively connected to computing device 600 as shown by block 640. Any applicable input/output (I/O) devices may be connected to computing device 600 as shown by input devices 635 and output devices 640. For example, a wired or wireless network interface card (NIC), a printer, a universal serial bus (USB) device or external hard drive may be included in input devices 635 and/or output devices 640.

Figure 7:
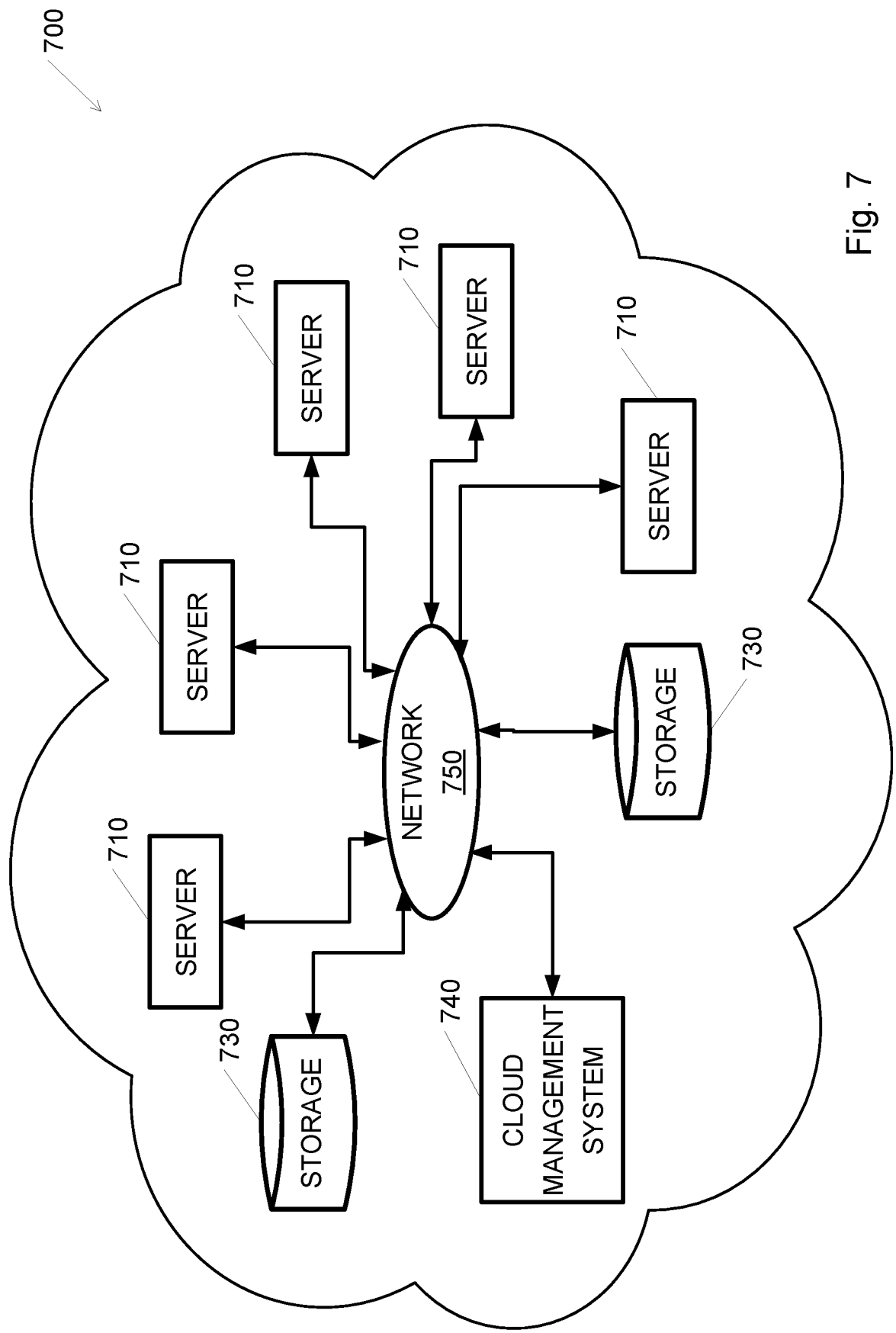
FIG. 7 is a high-level block diagram of a cloud-based computerized system according to some embodiments of the present invention.

Reference is made to FIG. 7, showing a high-level block diagram of a cloud-based computerized system 700 according to some embodiments of the present invention. Cloud-based computerized system 700 may include a plurality of servers 710 and a plurality of storage devices 730 interconnected by network 750, e.g., the internet, and managed by cloud management system 740. Servers 710 may be similar to computing device 600, and storage devices 730 may be similar to storage 630. Cloud management system 740 may be implemented on a computing device such as computing device 600. Servers 710 may provide computational power that may be allocated by cloud management system 740 for executing micro-services such as data capturing service 120, RTA manager 130, voice processor 140, VB engine 150, voiceprint generator 250 and voiceprint analyzer 255, as required. Cloud-based computerized system 160 may be implemented over cloud-based computerized system 700.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 620, computer-executable instructions such as executable code 625 and a controller such as controller 605.

The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 620 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 605), a plurality of input units, a plurality of output units, a plurality of memory units, and a plurality of storage units. A system according to some embodiments of the invention may additionally include other suitable hardware components and/or software components. In some embodiments, a system may include or may be, for example, a personal computer, a desktop computer, a laptop computer, a workstation, a server computer, a network device, or any other suitable computing device.

For example, a system according to some embodiments of the invention as described herein may include one or more devices such as computing device 600.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A method for audio analysis, performed by an at least one processor, the method comprising:
   a. sending a first audio packet to a voice processor, wherein the voice processor is configured to extract features of the audio;
   b. obtaining the extracted features from the voice processor;
   c. calculating, based on the extracted features, a quality grade of the first audio packet; and
   d. sending the extracted features to an at least one voice biometrics engine if the quality grade is above a threshold:
      wherein each of the at least one voice biometrics engines is configured to generate a voiceprint of the first audio packet, based on the extracted features of the first audio packet.

2. The method of claim 1, wherein each of the at least one voice biometrics engines is further configured to perform at least one of:
   authenticate a speaker by comparing a voiceprint of the first audio packet to a previously stored voiceprint of the same speaker,
   detect fraudsters by comparing the voiceprint of the first audio packet to previously stored voiceprints of known fraudsters; and
   enrich the previously stored voiceprint of the speaker with the voiceprint of the first audio packet.

3. The method of claim 1, comprising:
   obtaining the voiceprint;
   sending the voiceprint to an at least one voiceprint analyzer, wherein each of the at least one voiceprint analyzers is configured to perform at least one of:
      authenticate a speaker by comparing a voiceprint of the first audio packet to a previously stored voiceprint of the same speaker,
      detect fraudsters by comparing the voiceprint of the first audio packet to previously stored voiceprints of known fraudsters; and
      enrich the previously stored voiceprint of the speaker with the voiceprint of the first audio packet.

4. The method of claim 3, comprising:
obtaining the voiceprint by the at least one voiceprint analyzer; and
performing, by each of the at least one voiceprint analyzer, at least one of:
authenticating the speaker, detecting the fraudsters and enriching the previously stored voiceprint, in parallel.

5. The method of claim 1, comprising:
e. storing the extracted features in a repository if the quality grade is below the threshold;
f. upon receiving a second audio packet from a same speaker as the first audio packet, retrieving the voice features of the first audio packet; and
g. sending the second audio packet to voice processor together with the retrieved voice features of the first audio packet, wherein the voice processor is configured to modify the extracted features based on the second audio packet.

6. The method of claim 5, comprising:
h. obtaining the modified extracted features from the voice processor;
i. calculating, based on the modified extracted features, an updated quality grade;
j. sending the modified extracted features to the at least one voice biometrics engine if the updated quality grade is above the threshold;
k. storing the modified extracted features in the repository if the updated quality grade is below the threshold; and
l. repeating operations f-k until a session with the speaker is terminated.

7. The method of claim 6, wherein the updated quality grade equals a total amount of speech in the first and the second audio packets.

8. The method of claim 1, wherein the at least one processor is part of a cloud-based computing system, and wherein the voice processor and the voice biometrics engine are micro-services of the cloud-based computing system.

9. The method of claim 1, wherein the quality grade equals an amount of speech in the first audio packet.

10. A system for audio analysis, the system comprising:
a plurality of processors in-a a cloud-based computerized system, wherein the processors are configured to execute a plurality of micro-service types in parallel, wherein an authentication (RTA) manager micro-service is configured to:
a. send a first audio packet to a voice processor micro-service, wherein the voice processor micro-service is configured to extract features of the audio;
b. obtain the extracted features from the voice processor micro-service;
c. calculate, based on the extracted features, a quality grade of the first audio packet; and
d. send the extracted features to an at least one voice biometrics engine micro-service if the quality grade is above a threshold;
wherein each of the at least one voice biometrics engine micro-services is configured to generate a voiceprint of the first audio packet, based on the extracted features of the first audio packet.

11. The system of claim 10, wherein each of the at least one voice biometrics engine micro-services is further configured to perform at least one of:
authenticate a speaker by comparing a voiceprint of the first audio packet to a previously stored voiceprint of the same speaker,
detect fraudsters by comparing the voiceprint of the first audio packet to previously stored voiceprints of known fraudsters; and
enrich the previously stored voiceprint of the speaker with the voiceprint of the first audio packet.

12. The system of claim 10, wherein the RTA manager micro-service is configured to:
obtain the voiceprint;
send the voiceprint to an at least one voiceprint analyzer micro-service, wherein each of the at least one voiceprint analyzer micro-services is configured to perform at least one of:
authenticate a speaker by comparing a voiceprint of the first audio packet to a previously stored voiceprint of the same speaker,
detect fraudsters by comparing the voiceprint of the first audio packet to previously stored voiceprints of known fraudsters; and
enrich the previously stored voiceprint of the speaker with the voiceprint of the first audio packet.

13. The system of claim 10, wherein the RTA manager micro-service is configured to:
m. store the extracted features in a repository if the quality grade is below the threshold;
n. upon receiving a second audio packet from a same speaker as the first audio packet, retrieve the voice features of the first audio packet; and
o. send the second audio packet to voice processor micro-service together with the retrieved voice features of the first audio packet, wherein the voice processor micro-service is configured to modify the extracted features based on the second audio packet.

14. The system of claim 13, wherein the RTA manager micro-service is configured to:
p. obtain the modified extracted features from the voice processor micro-service;
q. calculate, based on the modified extracted features, an updated quality grade;
r. send the modified extracted features to the at least one voice biometrics engine micro-service if the updated quality grade is above the threshold;
s. store the modified extracted features in the repository if the updated quality grade is below the threshold; and
t. repeat operations f-k until a session with the speaker is terminated.

15. The system of claim 14, wherein the updated quality grade equals a total amount of speech in the first and the second audio packets.

16. The system of claim 10, wherein the quality grade equals an amount of speech in the first audio packet.

17. A method comprising:
transmitting by a processor a first audio packet to a process configured to calculate features of the audio packet;
determining by the processor, based on the features, a rating for the first audio packet; and
transmitting the extracted features to an at least one engine to create a voiceprint from the features if the rating is above a threshold;
wherein each of the at least one voice biometrics engine micro-services is configured to generate a voiceprint of the first audio packet, based on the extracted features of the first audio packet.

* * * * *